July 13, 1948.  R. W. JOHNSON  2,445,069
LIQUID FUEL FLOW CONTROL DEVICE
Filed Oct. 20, 1944
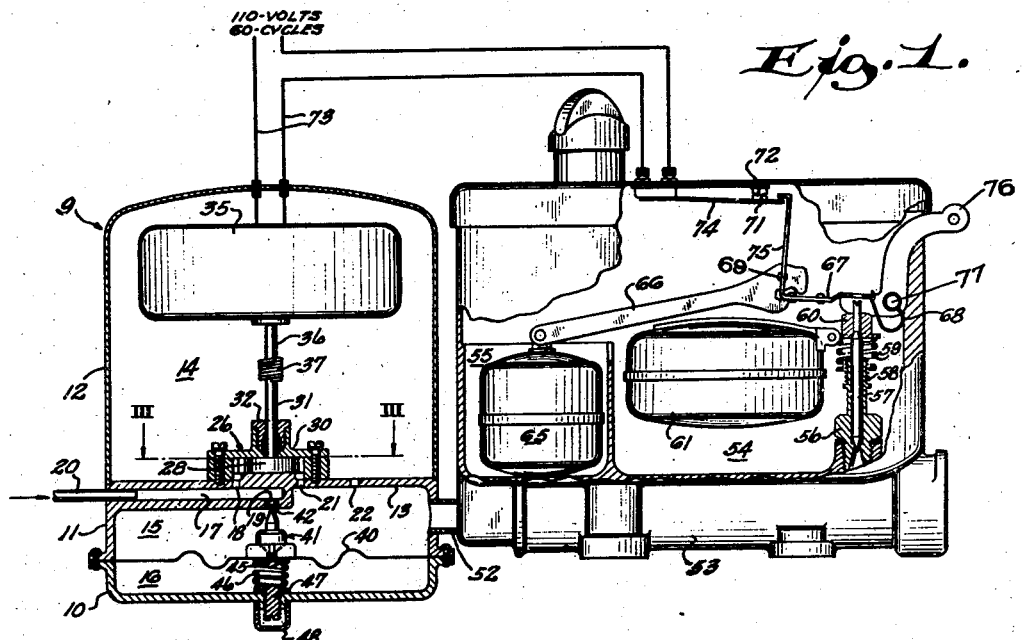
INVENTOR
ROY W. JOHNSON
BY John W. Michael
ATTORNEY.

Patented July 13, 1948

2,445,069

UNITED STATES PATENT OFFICE 2,445,069

LIQUID FUEL FLOW CONTROL DEVICE

Roy W. Johnson, Milwaukee, Wis.

Application October 20, 1944, Serial No. 559,629

8 Claims. (Cl. 103—26)

1

This invention relates to a combined device for controlling the flow of liquid fuel to a burner in which one means maintains a substantially constant pressure of fuel to another means controlling the supply of fuel to the burner under a substantially constant hydrostatic head.

It is one object of the invention to provide a device for supplying liquid fuel to a burner in which a substantially constant fuel pressure is maintained on a valve controlling the fuel flow to the burner.

Another object of the invention is to provide a device for supplying liquid fuel for controlling the supply of liquid fuel to a burner and employing a pump by which substantially constant pressure is maintained on a valve which maintains a substantially constant hydrostatic head in the conduit to the burner.

Another object of the invention is to provide a device employing a continuously operated pump with a by-pass controlled by a pressure-actuated valve for maintaining a predetermined pressure in the pump discharge to the inlet valve of a constant level type control means for maintaining a substantially constant hydrostatic head in the flow of fuel to a burner.

Another object of the invention is to provide a device combining a constant level type of control for the flow of liquid fuel to a burner with a pump for maintaining a constant pressure in the fuel supplied to the flow control.

Another object of the invention is to provide a device for controlling the flow of liquid fuel to a burner in which a float-actuated valve controlling such flow is combined with a power-driven pump for maintaining a constant discharge pressure of the pump until the float rises above a predetermined level.

Objects and advantages other than those above set forth will be apparent from the following description when read in connection with the accompanying drawing, in which:

Fig. 1 is a view with portions of the several housings broken and cut away and showing a combined pump and fuel level control device embodying the present invention;

Fig. 2 is an enlarged view of a portion of Fig. 1 to show the valve for preventing the production of excessive pressure in the device;

Fig. 3 is a sectional view on an enlarged scale of the pump and is taken on the plane of the line III—III of Fig. 1; and Fig. 4 is a vertical sectional view of a modified pump and the flow passages leading thereto and therefrom.

2

The present invention generally discloses a power-driven pump for bringing liquid fuel from a suitable source and discharging the fuel under pressure into a chamber from which fuel flow into a second chamber is controlled by a valve. The opening of the control valve is regulated by a float in the second chamber and maintains a predetermined level therein. If the control valve closes, continued operation of the pump actuates a relief valve responsive to pressure to open a passage for recirculating the fuel between the discharge and the inlet of the pump and thus prevents the production of excessive pressure even though the control valve is completely closed while pump operation continues. One embodiment of the invention also discloses an auxiliary float actuated by a rise in the fuel level in the second chamber above a predetermined value if the float valve fails to close, the auxiliary float acting for simultaneously securing forcible closure of the control valve and for interrupting the circuit of the electric motor driving the pump.

Referring to the drawing by reference numerals, the numeral 9 designates a housing enclosing a pump and its drive and including a bottom section 10, a central or intermediate section 11, and a top section 12. The intermediate section 11 is formed with a partition 13 substantially dividing the housing into chambers 14 and 15, the housing being also otherwise dvided, as will be described hereinafter, to provide a third chamber 16. The partition 13 is formed with a passageway 17 having a port 18 therefrom into the chamber 14 and a port 19 therefrom into the chamber 15. A conduit 20 is connected with the passage 17 and leads to a suitable source of liquid fuel (not shown). The partition 13 is also provided with ports 21 and 22, the purpose of which will appear hereinafter.

A pump, generally designated 26, is mounted on the partition 13 and in the chamber 14 to draw fuel through the passage 17 and port 18 and discharge the fuel by way of the port 21 into the chamber 15. The pump is driven by an electric motor 35 through shafts 36 and 31 which are interconnected by flexible coupling 37 and is preferably of the sliding vane type and comprises an annular casing 27 (see Fig. 3) mounted directly on the partition 13 and enclosing a rotor 28 eccentrically mounted in the casing and provided with vanes 29 sliding in slots in the rotor as is well known. The enclosure of the rotor 28 is completed by a cover plate 30 through which a pump drive shaft 31 extends. Leakage from the pump into the chamber 14 may be minimized by use of a suitable packing gland, indicated generally only at 32, although it is preferable to omit the packing gland and provide a port 22 which allows oil to flow into chamber 14 until the pressures in the chambers 14 and 15 are equalized. The omission of the packing gland has particular advantages in that the chamber 14 acts as an auxiliary reservoir for supplying fuel to a constant level device, if fuel supply to the pump fails, and to prime the pump, if necessary, after any interruption of pump operation while there is fuel at the source.

The chambers 15 and 16 are defined by a flexible diaphragm 40 shown as being fitted between the flanges of the pump housing sections 10 and 11 and forming a movable support for a needle type of valve, generally indicated at 41 and so positioned on the diaphragm that the needle is engageable with a seat 42 removably mounted in the port 19. The valve 41 comprises (see Fig. 2) a valve holder 43, mounted on one side of the diaphragm 40, in which a valve 44 is preferably movably mounted, as is well known, to secure proper seating of the point of the valve on the seat 42. A boss 45 is fixed on the other side of the diaphragm opposite the valve holder and forms a seat for one end of a helical compression spring 46 which acts to urge the needle valve 44 toward its seat 42. The other end of such spring is seated on the head of a stud 47 which is threaded into an aperture in the housing section 10 for the purpose of adjusting the degree of compression of the spring. The end of the stud 47 extending outside of the section 10 is enclosed in a hood 48 preventing accidental or unauthorized movement of the stud.

The chamber 15 is connected by a conduit 52 with an inlet passage in the housing 53 of a constant level device which is substantially divided into two chambers 54 and 55, and fuel flows from the inlet passage in the housing 53 into the chamber 54 by way of an aperture in which is mounted a valve casing 56 having a needle valve 57 movable therein toward and away from a seat formed therein. The valve 57 is biased toward open position by a spring 58 acting in conjunction with a spring 59 and a nut 60 threaded on the valve stem. A float 61 is pivotally mounted in the housing 53 and acts on the nut 60 to urge the valve 27 toward closed position if the level of fuel in the chamber 54 rises above a predetermined value. The structure of the valve and of the float and their action are well known and need not be further described herein.

A float 65 is located in the chamber 55 and is pivotally suspended from a latch member 66 which is pivotally mounted in the housing 53. A striker lever 67 is also pivoted in the housing and extends above the valve 57 and is biased toward such valve by a spring 68. The latch 66 is engageable with the striker 67 when the float 65 is substantially in the position shown. However, when the float 65 is lifted by the flow of oil into the chamber 55, the float tilts the latch 66 to disengage the end thereof from the striker 67 which is then snapped down by spring 68 on the end of the valve 57 and forcibly drives the valve into the closed position. A switch, including a movable contact 71 and a fixed contact 72 in the circuit indicated at 73 for the motor 35, is mounted inside the housing 53 and adjacent the striker plate 67. The movable contact 71 of the switch is mounted on a resilient strip 74 biasing the contact into circuit closing position and is engageable by an arm 75 extending from the striker lever 67 to open the switch when the striker snaps downwardly to close the valve 57.

In operation, the spring 46 holds the valve 44 on its seat 42 and fuel is pumped into the chamber 15 and passes into the chamber 54 at a rate dependent on the demand for fuel, and hence on the level of the fuel in the chamber 54 which is kept substantially constant by the action of the float 61 in adjusting the degree of opening of the valve 57. If the valve 57 is closed either partially or wholly, due to a decrease in the demand for fuel, the motor 35 continues to operate the pump 26 at its normal capacity, and, being a positive displacement type of pump, the pressure of the fuel in the chamber 15 rises until the diaphragm 40 is flexed against the action of the spring 46. Compression of the spring 46 and flexure of the diaphragm 40, due to the pressure acting on such diaphragm, moves the valve 44 away from its seat 42 in the port 19. Continued operation of the pump then merely circulates fuel through the discharge port 21, the port 19, and the inlet port 18, and does not draw in additional quantities of fuel from the source. Such recirculation hence has no effect on the pressure in the chamber 15 and continues until the valve 57 is again opened for a sufficient length of time to decrease the oil pressure in the chamber 15 below the value at which the spring 46 may re-flex the diaphragm 40 and move the valve 44 to close the port 19. Such closure of the port 19 closes off the above path for recirculation of the oil and the pump again draws oil by way of conduit 20 and passage 17 from the source and discharges the oil through the port 21 until the demand for fuel again decreases and again causes the above described operation of the relief valve 44.

During the above described normal operation of the combined device, the float 65 is in the position shown and the striker 67 is latched up against the action of the spring 68 and the resilient strip 74 holds the contact 71 in position to close the motor circuit. So long as the motor circuit is closed, the motor 35 will continue to drive the pump 26 to pump fuel under pressure into the chamber 15 and into the inlet passage of the housing 53. So long as the float 61 is capable of closing the valve 57, the level of fuel in the chamber 54 is maintained at its predetermined value and the above described operation of the device takes place.

However, if the float 61 is unable for any reason to close the valve 57, the level of fuel in the chamber 54 rises sufficiently to overflow into the chamber 55. The float 65 then rises and rocks the latch 66 clockwise about its pivot 69 to release the striker 67 which is snapped counterclockwise downwardly by the spring 68 and on the end of the valve 57 to drive the valve into closed position. Such downward movement of the striker 58 carries with it arm 75 extending from the striker and brings the end of the arm into engagement with the movable switch contact 71. The contact 71 is then pulled away from the fixed contact 72 to interrupt the circuit of the motor. If a demand for fuel now occurs, such fuel is supplied from the chamber 54 and from the chambers 14 and 15 until the level of fuel in such chambers drops to the point at which the float 61 completely closes the valve 57. The device is then out of operation and must be manually restarted after manually emptying chamber 55 by moving striker handle 76 downwardly to tilt the striker clockwise about its pivot 77 to tension the spring 68 and reclose the switch 71 and the latch 66 reengages the lifted striker 67 and holds the striker in raised position. The circuit to the motor 35 is then reclosed and the pump is again in operation. It will be noted that the level of the pump is below that of the seat for valve 57. Hence, the pump is kept in primed condition and immediately draws oil from the source into the chamber 15 from which the oil flows into the chamber 54 and the normal cycle of operations as above described is repeated.

A modified pump, shown in Fig. 4 differs from that above described only by the formation of an additional passage 80 in the partition 13 which passage is connected by way of conduit 81 with a source of fuel (not shown). The port 19 then forms a connection between the passage 80 and the chamber 15. Hence, when the pump is operating continuously with the inlet valve 57 closed, opening of the valve 44 causes recirculation of fuel from the chamber 15 through the port 19, the passage 80 and the conduit 81 back to the source of fuel, and from the source by way of the conduit 20, the passage 17, and the port 18, back to the pump. Such recirculation may be desirable under some circumstances such as when the burner is not consuming the usual quantity of fuel in which case continued recirculation of the fuel through the pump would cause an undesirable heating of the fuel. The above is particularly true in the case of larger units handling quantities of fuel of the order of several gallons per minute.

Although but two embodiments of the present invention have been illustrated and described, it will be apparent to those skilled in the art that various changes and modifications may be made therein without departing from the spirit of the invention or from the scope of the appended claims.

I claim:

1. A device controlling the flow of liquid fuel to a burner and comprising a casing defining a chamber, a valve controlling the flow of fuel into the chamber, a float in the chamber controlling the degree of opening of the inlet valve, a second casing connected with the inlet valve, a continuously driven pump discharging into the second casing, a by-pass connecting the second casing with the pump inlet, and means controlling the opening and closing of the by-pass and including a diaphragm in the second casing and subjected to the pressure therein, and a valve mounted on the diaphragm for movement thereby into and out of position to close the by-pass.

2. In a liquid flow control device, a casing, a valve controlling flow of liquid into the casing, means controlling valve opening dependent upon liquid flow from the casing, a continuously operated pump of the positive displacement type for maintaining liquid pressure on the control valve, a bypass between the pump discharge and the pump inlet, a diaphragm responsive to the pressure in the pump discharge, a valve opened by the diaphragm to bypass flow of pressure between the pump discharge and the pump inlet, and means for adjusting the diaphragm action from exteriorly of the casing enclosing the pump.

3. In a liquid flow control device, a casing, a valve controlling flow of liquid into the casing, means controlling valve opening dependent upon liquid flow from the casing, a continuously operated pump of the positive displacement type for maintaining liquid pressure on the control valve, a casing enclosing the pump and providing a passage between the pump discharge and the pump inlet, a diaphragm responsive to the pressure in the pump discharge, a valve opened by the diaphragm upon action thereon of pressure above a predetermined value and bypassing liquid from the pump discharge to the pump inlet, a stud threaded into the casing enclosing the pump, and a spring acting between the stud and the diaphragm whereby the action of the diaphragm is adjustable from exteriorly of the casing enclosing the pump.

4. In a device controlling the flow of a liquid, a casing defining a plurality of chambers, a valve controlling flow of liquid into the casing, a main float in one of the casing chambers and acting continuously to control opening of the valve, an electric motor-driven pump maintaining liquid pressure on the valve, a switch controlling energization of the pump motor, and an auxiliary float in another of the casing chambers and acting upon rise in liquid level therein to open the switch.

5. In a device controlling the flow of a liquid, a casing defining a plurality of chambers, a valve controlling flow of liquid into the casing, a main float in one of the casing chambers and acting continuously to control opening of the valve, an electric motor-driven pump maintaining liquid pressure on the valve, a lever biased to strike on the valve, a switch opening upon release of the striker lever and interrupting energization of the pump motor, and an auxiliary float in another chamber in the casing to cause release of the striker lever upon rise in the liquid level in the chamber.

6. In a device controlling the flow of a liquid, a casing defining a plurality of chambers, a valve controlling flow of liquid into the casing, a main float in one of the casing chambers and acting continuously to control opening of the valve, an electric motor-driven pump maintaining liquid pressure on the valve, a switch controlling energization of the pump motor, a lever biased to strike on the valve and to open the switch with a snap action, a latch retaining the striker lever in position for action, and an auxiliary float in another chamber in the casing and connected with the latch for releasing the same upon rise in liquid level in the casing above a predetermined value.

7. In a liquid supply system, in combination, a casing, a metering valve controlling flow of liquid into the casing, a pump maintaining a supply of liquid to the valve, means responsive to liquid level in the casing to close the valve when the level reaches a predetermined maximum, means responsive to an increase in said level over said maximum to render the pump inoperative, and valve means responsive to an increase in liquid pressure above a predetermined maximum between the pump and the valve to by-pass liquid from the delivery side to the intake side of the pump.

8. In a fuel supply system, in combination, a chamber, a pump maintaining a supply of fuel to the chamber, a metering valve controlling fuel flow into the chamber from the pump, means responsive to fuel level in the chamber to close the valve when the level reaches a predetermined maximum, means cooperating with the valve and responsive to an increase in the fuel level over said maximum to render the pump inoperative and to bias the valve towards its closed position, and means responsive to an increase above a predetermined maximum fuel pressure between the pump and the valve to by-pass fuel to the pump intake to maintain a constant pressure between the pump and the valve.

ROY W. JOHNSON.

REFERENCES CITED

The following references are of record in the file of this patent:

UNITED STATES PATENTS

| Number | Name | Date |
|---|---|---|
| 733,159 | Trotter | Feb. 21, 1905 |
| 976,917 | Richards | Nov. 29, 1910 |
| 1,244,667 | Wellington | Oct. 30, 1917 |
| 1,352,123 | Green | Sept. 7, 1920 |
| 1,380,442 | Trumble | June 7, 1921 |
| 1,546,558 | Van Guilder | July 21, 1925 |
| 1,653,885 | Van Guilder | Dec. 27, 1927 |
| 1,675,079 | Zisch | June 26, 1928 |
| 1,868,444 | Bechtold | July 19, 1932 |
| 1,914,541 | Teesdale | June 20, 1933 |
| 1,916,433 | Muller | July 4, 1933 |
| 2,146,398 | Lafferty | Feb. 7, 1939 |